April 13, 1943.   J. DAWSON   2,316,408
RECIPROCATING CAM MECHANISM
Filed Oct. 3, 1941
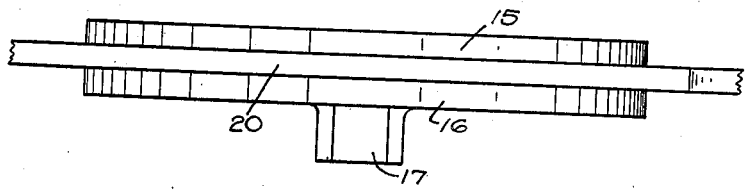
FIG. I.
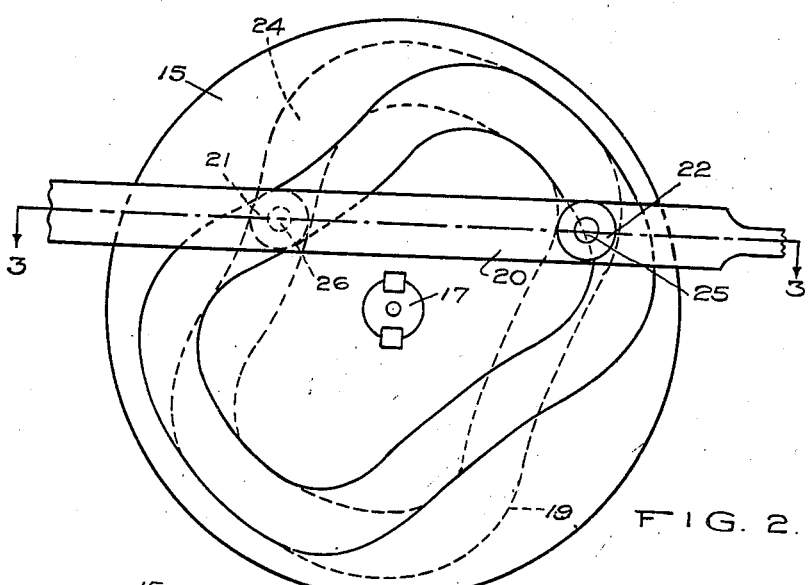
FIG. 2.
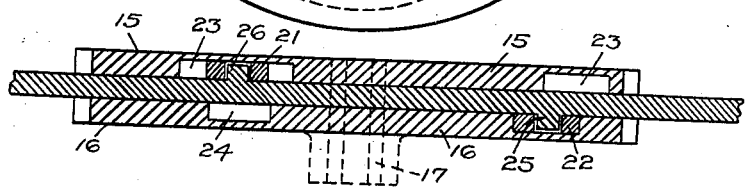
FIG. 3.
INVENTOR.
J. Dawson.
By Edward N. Fetherstonhaugh.
ATTORNEY.

Patented Apr. 13, 1943

2,316,408

UNITED STATES PATENT OFFICE 2,316,408

RECIPROCATING CAM MECHANISM

Joseph Dawson, Toronto, Ontario, Canada

Application October 3, 1941, Serial No. 413,536

7 Claims. (Cl. 74—55)

The invention relates to reciprocating cam mechanisms as pointed out in the present specification and illustrated in the accompanying drawing, which forms part of the same.

The invention consists essentially of a mechanism for converting reciprocating into rotary motion or vice versa while providing any desired degree of offset as between the centre of rotary motion and the line of action of the reciprocating motion, thus eliminating dead centre as pointed out broadly and specifically in the claims for novelty following a description containing an explanation in detail of an acceptable form of the invention.

The objects of the invention are to furnish a device for imparting a rotary motion to one or more members by one or more reciprocating members, to provide increased efficiency over existing cam mechanisms, as the off-centre reciprocating member eliminates dead centre and the accompanying loss of power, to furnish a more smooth and uniform motion by means of the leverage gained by the off-centre principle producing the highest mechanical efficiency, to eliminate all arcuate or U-shaped reciprocating members, to reduce oil wastage and insure a lower fuel consumption; and generally to provide an improved cam mechanism for connecting a rotary and reciprocating element by means of which more uniform motion and increased power is obtained together with lower constructional and maintenance costs.

In the drawing Figure 1 is a plan view of the cam mechanism.

In the drawing Figure 2 is an elevational view of the cam mechanism with one of the discs removed but showing the cam groove formed in the removed disc in dotted lines.

In the drawing Figure 3 is a sectional view of the discs and the reciprocating member on the lines 3—3 in Figure 2.

Like numerals of reference indicate corresponding parts in the drawing.

Referring to the drawing: A pair of circular discs 15 and 16 are keyed to a central shaft of axis 17 to constitute the rotary member. In the inner faces of the discs 15 and 16 are cut the two cam grooves 18 and 19. It will be seen that the major and minor axis of each cam groove makes an acute angle with the respective major and minor axis of the cam groove on the disc opposite.

With respect to the relation of the axes of the cam grooves it is to be observed that any degree of angularity may be obtained, depending only on the vertical distance between the central axis of the rotary shaft 17 and the longitudinal central axis of the reciprocating element 20.

The connecting rod or reciprocating member 20, extends between the discs 15 and 16 and attached thereto are the roller bearings 21 and 22, each roller bearing constituting a driving or transmitting connection between the rotary or driven discs or member 15 and 16 and the reciprocating or driving member 20.

The roller bearing contacts 21 and 22 operate by sliding pressure along their own paths of travel which in the case of the roller bearing 21, is the groove 18 in the disc 15 and in the case of the roller bearing 22, is the groove 19 in the disc 16.

The roller bearing contacts 21 and 22 are fitted over the pins 26 and 25 respectively, which form part of the reciprocating member 20.

In operation, as force is applied to the reciprocating member 20, which slides on its own bearings not illustrated, pressure is at once transmitted from the pin 26 and 25 through the operation of the roller bearings 21 and 22, to the walls of the cam grooves 18 and 19 causing the keyed discs 15 and 16 to rotate on their common axis 17.

If the movement imparted to the reciprocating member 20 is first to the right, that is in the direction of the pin 22, the pressure from the grooves forces the rotary member or discs 15 and 16 to revolve in a clock-wise direction, while if the motion first imparted to the reciprocating member 20 is to the left, that is in the direction of the pin 26, the rotary movement imparted to the discs is still clock-wise.

Owing to the fact mentioned above that the major and minor axis of the cam grooves 18 and 19 in the discs 15 and 16 are at an acute angle with respect to each other, there is no possibility of the roller bearings 25 and 27 being simultaneously at the vertices of these axes and thus dead centre is eliminated entirely so that by means of the resulting increased leverage, greater force and more uniform motion is thus produced on the rotary member or discs 15 and 16, by a given reciprocating input of power.

It will be understood of course that the importance of eliminating the dead centre at the vertices of the major and minor axes of the cam grooves lies in the fact that not only is wear and tear reduced on the mechanism itself, but greater power is obtained and the present almost universal necessity of providing a secondary unit or other exterior means of eliminating the dead centre area, is avoided.

The source of power mentioned above may be in the form of steam, compressed air, electricity, internal combustion engine, etc., and the avoidance of a secondary unit whose function is merely to create an off-centre condition for the purpose of rapid and easy starting, and to avoid locking, is an essential feature of the invention.

It is of course clear that the discs may be used as the driving member in which case the reciprocating member 20 is the driven member or, alternatively, the reciprocating member 20 may be the driving member in which case the keyed discs are the driven member.

What I claim is:

1. A reciprocating cam mechanism comprising a rotary member and a reciprocating member adapted to reciprocate at any predetermined vertical distance from the axis of rotation, connecting and transmitting members each forming an independent driving connection between said rotary and reciprocating members.

2. A reciprocating cam mechanism comprising a rotary member, and a straight reciprocating member mounted for reciprocation at any desired degree of offset in relation to the axis of rotation of said rotary member, connecting members carried by the reciprocating member and constituting the driving connection between said rotary and reciprocating member, means for keeping the connecting members in constant engagement with the rotary member during rotation.

3. A reciprocating cam mechanism of the class described comprising a plurality of discs, means for rotating said discs, a straight reciprocating member adapted to reciprocate above or below the central axis of said discs, roller bearing contacts carried by said member, and constituting the driving and transmitting connection to said discs.

4. A reciprocating cam mechanism of the class described comprising a plurality of discs, means for rotating said discs, a straight reciprocating member adapted to reciprocate above or below the central axis of said discs, a plurality of rolls attached to the rod and constituting the driving and transmitting connection to said discs, each of said rolls operating through its own path simultaneously in each of said discs.

5. A reciprocating cam mechanism of the class described comprising a plurality of discs, means for rotating said discs, a straight reciprocating member adapted to reciprocate above or below, to the left or to the right of the central axis of the discs at a predetermined distance, said member having driving and transmitting connections to the discs.

6. A reciprocating cam mechanism of the class described comprising a driving member geared or driven at a predetermined ratio, a plurality of discs and a straight reciprocating member, continuous channels on the inner faces of the said discs adapted to be engaged by rolls attached to pins on the reciprocating member and constituting the driving and transmitting connections to said discs, means for utilizing the indefinite forces imparted to said reciprocating member without loss of uniformity of motion or rotary speed of motion by said disks, said means consisting of the enlargement of the total indefinite forces by tangential leverage on said rotary discs.

7. A reciprocating cam mechanism of the class described comprising a central axis, a plurality of discs keyed to said axis, a driving member adapted to revolve said discs, a straight reciprocating member having driving and reciprocating members attached thereto, continuous cams on the inner face of each of said discs adapted to be engaged by said driving and reciprocating members each of which is operating through its own path in each of said discs.

JOSEPH DAWSON.